United States Patent
Keskar et al.

(10) Patent No.: US 7,028,020 B1
(45) Date of Patent: Apr. 11, 2006

(54) INTERACTIVE TECHNIQUE TO AUTOMATICALLY FIND AND ORGANIZE ITEMS SIMILAR TO EXAMPLE ITEMS

(75) Inventors: Dhananjay V. Keskar, Beaverton, OR (US); Dean J. Sanvitale, Hillsboro, OR (US); Mic Bowman, Beaverton, OR (US); Robert Adams, Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 09/608,612

(22) Filed: Jun. 30, 2000

(51) Int. Cl.
*G06F 17/30* (2006.01)

(52) U.S. Cl. .................... 707/1; 707/3; 707/10; 706/47

(58) Field of Classification Search ................ 707/4, 707/15, 6, 3, 10, 1, 7, 503, 100; 703/11; 705/5; 706/47, 45; 704/9; 716/1
See application file for complete search history.

(56) References Cited

U.S. PATENT DOCUMENTS

| | | | | |
|---|---|---|---|---|
| 6,070,160 | A * | 5/2000 | Geary ............................ | 707/4 |
| 6,081,774 | A * | 6/2000 | de Hita et al. ................... | 707/3 |
| 6,182,060 | B1 * | 1/2001 | Hedgcock et al. ............. | 707/1 |
| 6,246,975 | B1 * | 6/2001 | Rivonelli et al. ............. | 703/11 |
| 6,253,198 | B1 * | 6/2001 | Perkins .......................... | 707/3 |
| 6,336,117 | B1 * | 1/2002 | Massarani .................. | 707/100 |
| 6,360,205 | B1 * | 3/2002 | Iyengar et al. ................. | 705/5 |
| 6,405,197 | B1 * | 6/2002 | Gilmour ........................ | 707/5 |
| 6,460,025 | B1 * | 10/2002 | Fohn et al. .................... | 706/45 |
| 6,463,434 | B1 * | 10/2002 | Zhai .............................. | 707/6 |
| 6,493,695 | B1 * | 12/2002 | Pickering et al. ............. | 706/47 |
| 6,493,703 | B1 * | 12/2002 | Knight et al. .................. | 707/3 |
| 6,611,840 | B1 * | 8/2003 | Baer et al. .................. | 707/102 |

\* cited by examiner

*Primary Examiner*—Jeffrey Gaffin
*Assistant Examiner*—Hassan Mahmoudi
(74) *Attorney, Agent, or Firm*—Blakely, Sokoloff, Taylor & Zafman LLP

(57) ABSTRACT

A technique for automatically finding and organizing items similar to example items includes providing related, not related, and suggestions group areas for one organization instance, each in these areas to contain items which may consist of documents. At least one example item for the one organization instance is provided by a user and placed in the related group area of the one organization instance. A database is searched using a relevance algorithm to try to locate at least one item which is related to the at least one item in the related group area based on a predetermined criterion and the located at least one item is placed in the suggestions group area of the one organization instance. The predetermined criterion is modified based on at least one of the user providing at least one additional example item and the user moving an item from one of the group areas to another of the group areas. The database is continually searched to locate and place additional items in the suggestions group area of the one organization instance which are related to the at least one item in the related group area based upon the modified predetermined criterion.

22 Claims, 3 Drawing Sheets

INTERACTIVE TECHNIQUE TO AUTOMATICALLY FIND AND ORGANIZE ITEMS SIMILAR TO EXAMPLE ITEMS

BACKGROUND OF THE INVENTION

1. Field of the Invention

The present invention relates to an interactive technique for automatically finding and organizing items similar to example items.

2. Description of the Related Art

Most computer users organize items, such as files, e-mail messages, tasks, URLs, etc., to manage necessary and useful information. The most common form of organization involves some form of hierarchical folders in which these items are placed. These folders and items can be at the system level via the file system or internal to a particular application, such as a mail client or a Web browser. In some cases, the application, for example, Microsoft Internet Explorer, provides a hierarchical organizational mechanism, for example, "bookmarks", which is directly transformed into a file system hierarchy, such as the "Favorites" folder in the "Windows" directory. In other cases, for example, Microsoft Outlook, the hierarchy is maintained internally.

Several "find tools" enable users to search for and display items matching certain attributes, for example, names, date-time, items containing specific keywords, etc., across the folder hierarchy at various levels. Some allow the query and the search results to be saved as an item, for example, a "shortcut" in the file system, while others combine a folder with the query expression as its property, conceptually creating a "search results folder". Clicking on the folder displays items that satisfy the query and show up temporarily as items inside the folder.

Several information retrieval techniques exist for gathering documents and building a vector representing the documents both singly and in combination. Vector space methods can then be used for analyzing document similarity, which in turn can be used for classifying documents into categories. Various techniques for building the vectors and carrying the classification and adapting the query vectors based on past results have been studied and reported.

The AltaVista Discovery tool shows items similar to the current Web page that the user is browsing. Alexa similarly provides a "Related Links" capability with the same functionality.

None of the above-noted techniques help in organizing related items by displaying suggestions which in turn can be made part of the organization nor does a change in the organization immediately trigger any suggestions. Furthermore, none of the above-noted techniques takes advantage of vector-space information retrieval, nor do commonly used "find" tools, that is, tools used to find similar items, with or without associated organization metaphors, provide suggestions based on similarity of content to prototypical example documents.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents a brief description of the drawings, wherein.

DETAILED DESCRIPTION

Figure 1:
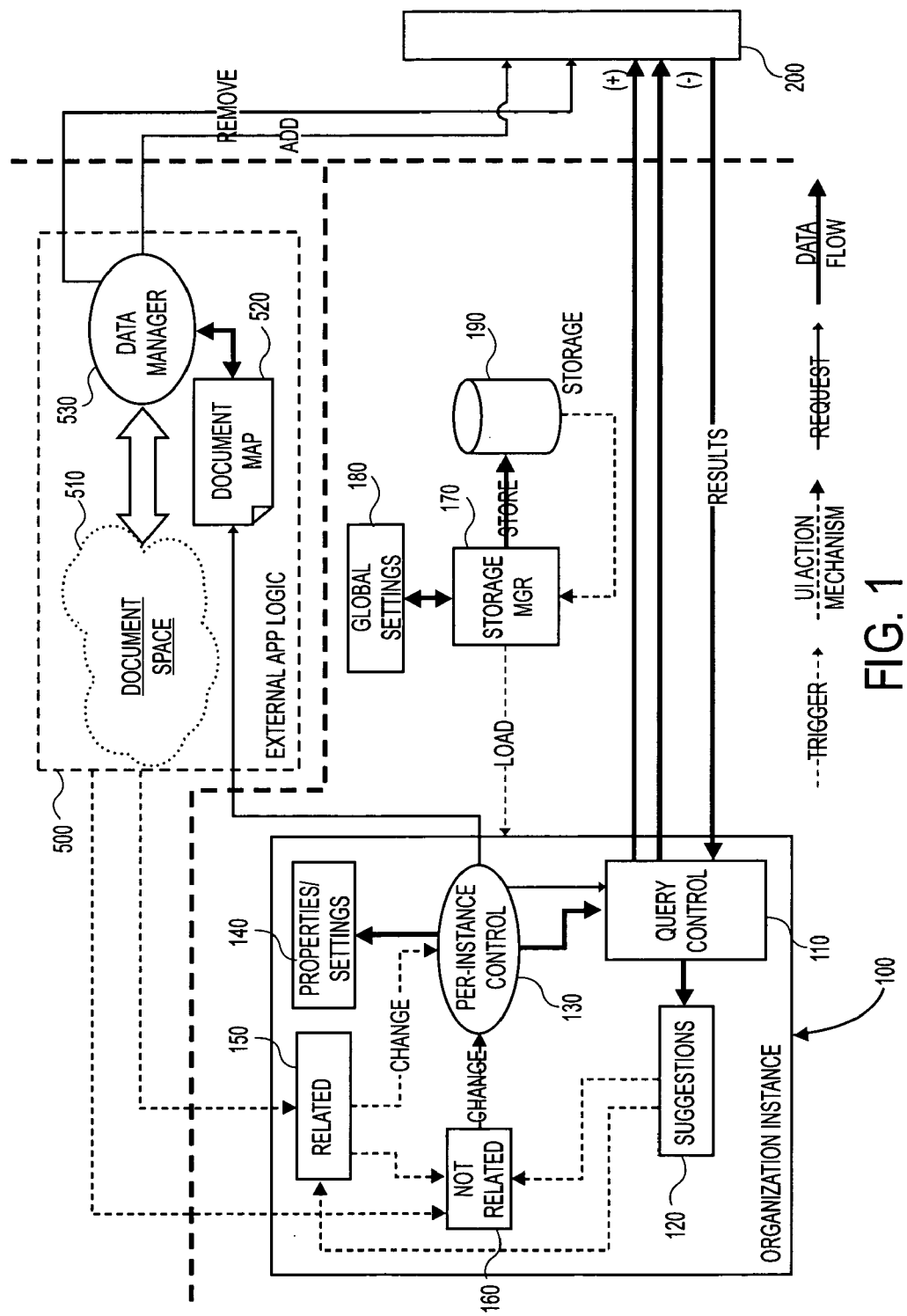
FIG. 1 illustrates one example implementation technique in accordance with the present invention.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Lastly, well-known power connections to various components are not shown within the drawing figures for simplicity of illustration and discussion and so as not to obscure the invention.

No other technique has been found that performs all the following features of the present invention. Namely, the present invention bases the "find", that is, the located items, on a set of examples which also form the initial organization, that is, "related items". The present invention can perform a "find" of items similar to multiple example items, and maintains a distinction between user-organized items and the results of a "find". The present invention also allows automatic refinements of the "find" based on interactive changes to the user-controlled organization, and uses information about discarded suggestions, that is, "not related items", to refine the query and to give less importance to items that are similar to those discarded by the user.

The present invention is an improvement upon the arrangements noted in the Related Art section above in that in the present invention, the "find" is based on a set of examples which also form the initial organization, that is, the "related items". Furthermore, the present invention is capable of performing a "find" of items similar to multiple example items and can maintain a distinction between user-organized items and the results of a "find". Still furthermore, the present invention allows for the automatic refinement of the "find" based on interactive changes to the user-controlled organization and further uses information about discarded suggestions to refine the query and give less importance to items that are similar to those discarded by the user.

In the technique of the present invention, a user interfacing with his or her computer in accordance with a present invention would first select one or more example documents containing relevant subject matter. Then, the technique of the present invention would review all of the user documents and provide an indication, for example, a list, of those documents found to be most relevant to the user, that is, a "suggestions" grouping of documents. The user would then review the list of documents in the "suggestions" grouping. The user would be able to retrieve the actual document by user manipulation, for example, double-clicking the document to be reviewed on the list, so as to determine its actual relevance. The user would then move one or more of the documents in the "suggestions" grouping to either of the "related" grouping or the "not related" grouping. The user may also subsequently realize that a document in either the "related" or "not related" grouping doesn't belong in that grouping and may move the document. Based on the movement of the documents by the user from one grouping to another, the searching and relevance calculations in accordance with the present invention are continuously updated so as to add or delete documents from the "suggestions" grouping. This allows the user to access the most pertinent documents related to an example document or example documents without having to review an enormous number of documents.

The present invention allows the user to conceptually group together a set of one or more items which are related in some manner.

The present invention finds and displays suggestions for items that are similar to the group of related items. The content and other attributes of the group of related items are used as examples of prototypes, forming the basis of a query, with items that are not related exerting a negative influence. The suggested items are different from those already in the related or not related groups and are ranked according to their relevance to the related items.

The present invention also allows the user to interactively move any suggested item to the group of related items, and to indicate disinterest by moving a related item or suggested item into the group of not related items, and to refine the groups of related and not related items by discarding items out of them.

The present invention refreshes the list of suggested items based on the new set of examples in response to a change in either the group of related items or the group of not related items.

The present invention also displays enough pertinent information about each related and not related and suggestion items so as to enable the user to know the item at a glance.

Lastly, the present invention allows the conceptual organization, that is, the related items, and the refinement, that is, the not related items, to be saved and later reopened. Upon reopening, the suggestions would be based on the latest available items. In addition, the basis for the query that results in the suggestions can either be dynamic, taking current availability of related and not related items into account, or static, retaining stored characteristics of related and not related items.

It is to be noted that, at any point, the automatic "find", that is, the automatic locating of the related items, can be de-coupled from the example set consisting of the related items and the not related items. In such a case, the user can base the "find" on certain selected keywords such as in a normal "find" or can disable the "find" entirely.

The present invention can then be extended and applied in various useful ways. It can be used as a basis for more sophisticated desktop information management techniques as well as to facilitate innovative techniques for sharing and collaboration among different users.

The technique in accordance with a present invention offers several advantages over the other less advantageous techniques noted above, namely:

1. It can use a set of items as the basis for a query to find other items that are similar to it in some underlying manner. In an organizational task, this is equivalent to using a lever or a jack. That is, starting with a small amount of work, for example, taking one example item, the technique quickly provides suggestions for similar items. Since most organization is based on such underlying similarity, for example, similar content, author, etc., the suggestions provide additional candidates related to the examples and to each other and which can be organized with minimal effort.

2. It provides a quick and useful mechanism to indicate disinterest in certain items, while at the same time, removing them from consideration via the not related group of items. Furthermore, this refines the query so that those kind of items, that is, those items of disinterest, are ranked lower in the suggestions list.

3. The related items function as the user-controlled organization group while the suggestions dynamically locate similar items that have since become available, maintaining a clear distinction between the manual and automatic items. The user's familiarity with the organization is retained while similar new and updated items are also shown, thereby giving the user the opportunity to incorporate any of the suggestions into the user controlled related items. Since the user ultimately controls the organization, with the computer displaying suggestions, the present invention overcomes the issues of user trust that plague other automatic organization implementations.

4. Since the grouping is conceptual, the storage requirements can be very small. The actual related and not related items can be physically located anywhere. The technique in accordance with the present invention only retains information necessary to identify and extract an item rather than storing the items themselves. The suggestions are re-computed each time and do not have to be stored.

Figure 2:
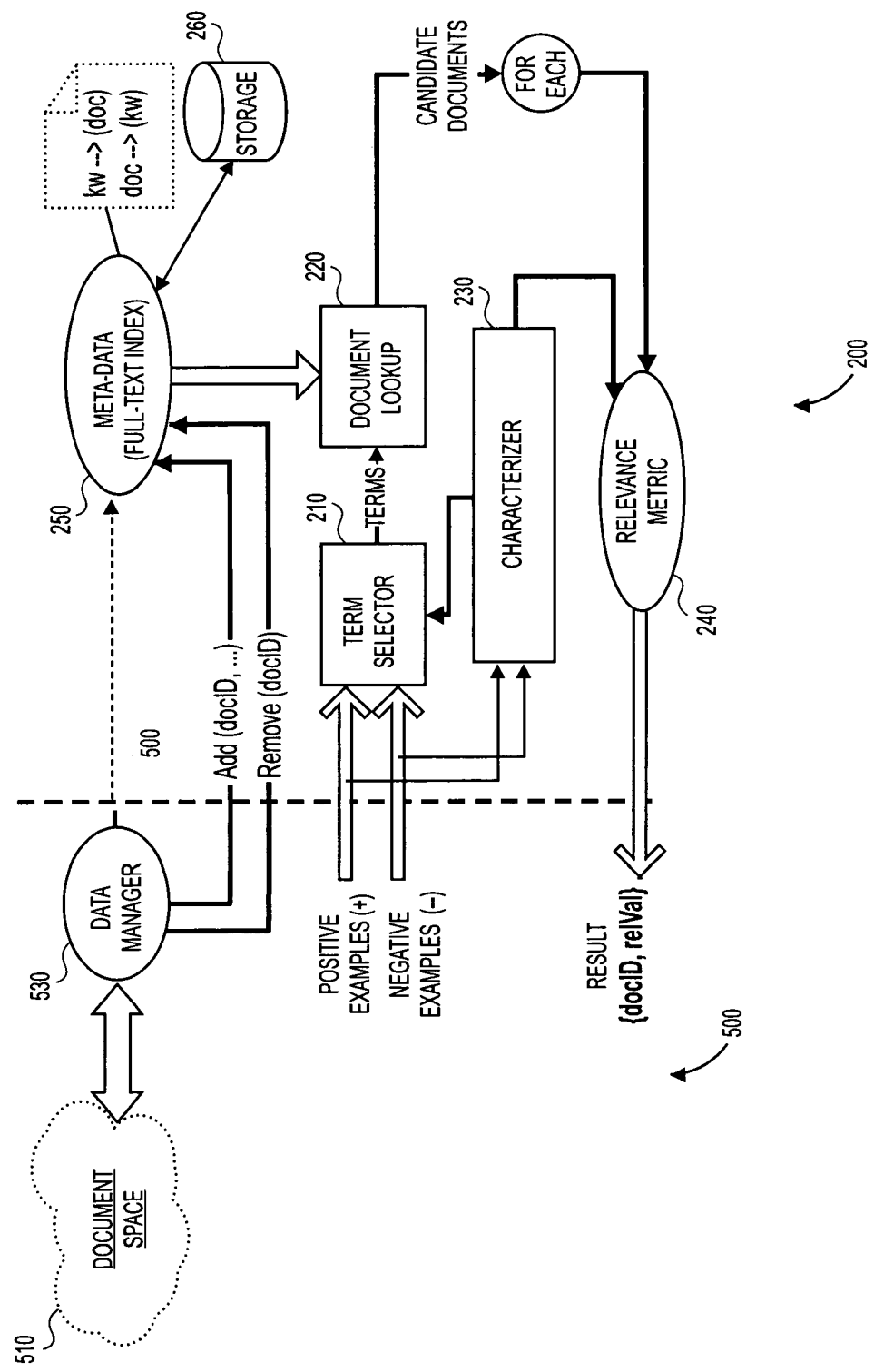
FIG. 2 illustrates in detail an example of one of the elements illustrated in FIG. 1.

FIG. 1 illustrates an example implementation technique of the present invention while FIG. 2 illustrates in detail an example of one of the elements illustrated in FIG. 1. It is to be noted that FIGS. 1 and 2 are not block diagrams nor are they flowcharts. Rather, the boxes represent functions performed in accordance with the illustrated technique and the flow of data and signals. Furthermore, in the description to follow, documents are referred to. However, the present invention is not limited to documents per se but rather can be used to organize any group of items capable of being classified as to their relevance.

Included in FIG. 1 is a block 100 labeled organization instance. Included in block 100 is a query control 110, a suggestions block 120, a per-instance control 130, a properties/settings block 140, a related block 150, and a not related block 160. Also included in FIG. 1 is a storage manager 170, a global settings unit 180, a storage unit 190, and an element 200, which is illustrated in FIG. 2 in detail, for fast retrieval and ranking of documents relevant to a query based on example documents.

FIG. 1 also includes an external application logic block 500, containing a document space 510, a document map 520, and a data manager 530.

Included in FIG. 2 is the element 200 of FIG. 1. The element 200 includes a term selector 210, a document lookup 220, a characterizer 230, a relevance metric 240, a meta-data block 250, and a storage unit 260.

The organization instance block 100 includes the suggestions, related, and not related blocks 120,150, and 160. Each of these blocks corresponds to groupings of documents. The suggestions documents are those documents which have been selected by the present invention as being relevant to the related documents. The related documents are those documents selected by a user as being related to each other and may include documents previously located in the suggestions grouping and transferred by the user to the related grouping. The not related grouping are those documents selected by a user as not being related to the related grouping of documents and may include documents previously contained in the related grouping as well as documents contained in the suggestions grouping.

In operation, a user interface, such as a graphic user interface, may contain three "panes" respectively corresponding to the suggestions, related, and not related blocks 120,150, and 160. The user then may drag and drop documents from one pane to another as he or she sees fit. Normally, the user would open one of the documents in the suggestions pane and based on the user's review, would move that document to either the related or not related pane.

Note that in FIG. 1, each organization instance 100 corresponds to a distinct organization in accordance with the present invention. That is, in accordance with the present invention, there may be several distinct organizations of documents, each organization corresponding to a particular subject matter.

The user interface allows for the user to move documents from one group of documents in one instance to another group of documents in the same instance, such as moving a document from the suggestions group to the related group, or allows the user to move documents from one group of documents in one instance to another group of documents in another instance, such as from the suggestion group in one instance to the related group in another instance.

The per instance control 130 is a centralized piece of logic that changes things based upon the manipulations of the user interfacing with the user interface. The query control 110 provides positive and negative examples of documents to the element 200 and based on these positive and negative examples, as will be discussed in detail below, the element 200 provides "results" to the query control 110. These "results" are documents which are believed to be related to the related grouping of documents 150 and these documents are provided to the user in the suggestions pane for review by the user.

Based on the selections of the user, that is, the user moving a document from the suggestions grouping 120 to either the related or not related groupings 150 or 160 or moving a document from the related grouping 150 to the not related grouping 160 or vice versa, the external application logic 500, in conjunction with the data manager 530 and document map 520 and document space 510, provides information to the element 200 as to whether to add or remove a document.

The property/settings box 140 merely interfaces the user with the per-instance control 130 and the query control 110 and may include such operations as allowing the user to select the number of documents to be provided in the suggestions grouping 120 or which of the three panes of the groupings are to be visible on the user interface.

The external application logic 500 works in the background as essentially an interface between the organization instance block 100 and the element 200. The data manager 530 also manages the addition and removal of metadata about the documents in the document space 510, to and from the element 200. It can be doing this in the background. For example, if a user double clicks a particular document that the user wishes to open and review, the per-instance control 130 sends a signal to the document map 520. The document map 520 tells the data manager 530 where the selected document is located, for example, that the selected document is a particular e-mail message. This allows the data manager 530 to locate the document in the document space 510 and display it on the user interface.

It is to be noted that the document map 520 does not store the documents themselves but rather serves as an index to allow the data manager 530 to locate the documents contained in the document space 510. In the present invention, the documents contained in the document space 510 are not limited to those documents in one particular application but rather may include documents contained in any application disposed in a user's computer. That is, the technique in accordance with the present invention may search all of the documents stored in all of the folders of the user's computer to locate those documents which are relevant to the example documents or documents.

The present invention continuously updates the suggestions based upon the manipulation by the user. That is, as noted in FIG. 1, if the user moves a document to either the related group 150 or the not related group 160, the change in the document grouping is inputted to the per-instance control 130 which in turn transfers this information to the element 200 via the query control 110. The element 200 in turn may make new suggestions or alter the previously provided suggestions based on the change in the document grouping. This allows for the user interface data to be continually updated interactively in response to the manipulation by the user. That is, a new search does not have to be initiated by the user.

Figure 3:
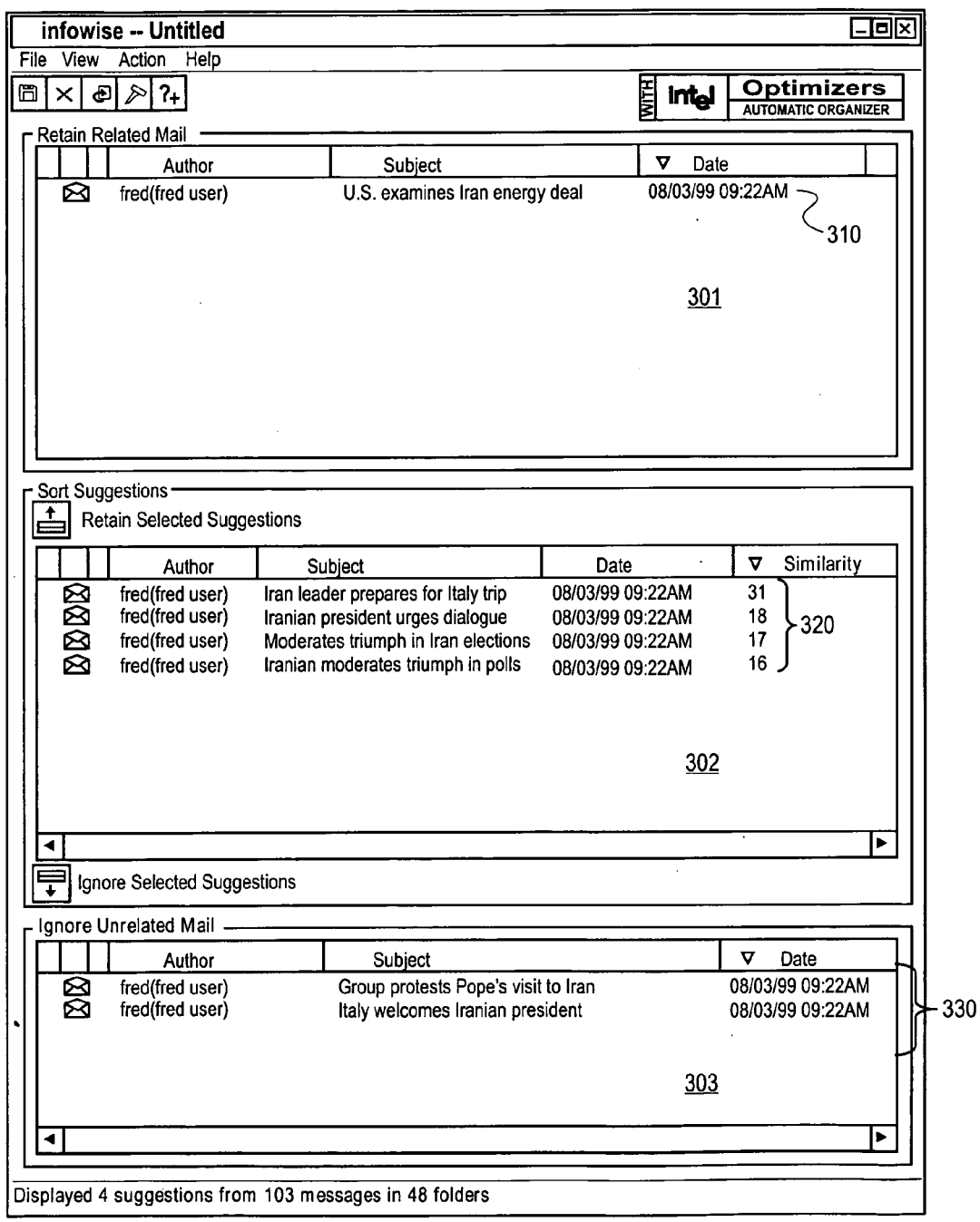
FIG. 3 illustrates a screen shot of a display of an example implementation technique in accordance with the present invention.

FIG. 3 illustrates a screen shot of one example of a display which might be seen by a user in accordance with the present invention. Note that there are three panes 301,302, and 303 which correspond to the related, suggestions, and unrelated groups. Pane 301 contains one item 310 while pane 302 contains four items 320 and pane 303 contains two items 330. By utilizing a mouse (not shown), or by utilizing a keyboard (not shown), the user may move an item from the items 320 to either pane 301 or pane 303. Alternatively, the user may move an item from items 330 to pane 301 or move item 310 to pane 303. It is of course understood that this is merely one example of a display which may be used with the technique of the present invention. Other different graphical user interfaces may also be used with the technique of the present invention.

The storage manager 170 controls the storage of the organization instance 100 in the storage unit 190 in conjunction with the global settings unit 180.

Referring now to FIG. 2, which illustrates in detail the features of element 200 of FIG. 1, the purpose of element 200 is to use multiple, for example, positive and negative, example documents as the basis for a query by mathematically representing the input set and then testing the mathematical representation by finding commonality amongst the documents in the query example set and characterizing the individual documents in the query example set. Element 200 may then use term selection and index lookup for the selected terms to quickly reduce the total number of documents to a list of documents which are candidates for being relevant to the query. Element 200 may then calculate the meaningful relevance of each candidate document with respect to the input set and assign a "relevance score", for example, a number between zero and one hundred, to each document.

As shown in FIG. 2, meta-data 250 with respect to the document space 510 is stored in storage unit 260 for later use. This can be put in or controlled by data manger 530. The stored information allows element 200 to form a set of documents which contain a given word or term or alternatively, determine the set of words or terms and their occurance count in a given document. The meta-data is maintained by the external application logic 500 which includes the document space 510 and which performs the additions and deletions as appropriate. In FIG. 2, docID refers to a unique identifier for each document which is provided by the external application logic 500.

The query control 110, in some organization instance 100, logic 500 provides a set of positive and negative example documents for each organization instance. The documents are analyzed to extract terms along with their occurance counts for each document. The term selector 210 uses this information along with the document length and the most important terms from each document to deduce the most important terms from the whole input set.

The characterizer 230 compares each of the input set documents with the entire input set and adjusts the mathematical "weight" or value of terms in the document based on this information. This feedback essentially adjusts the "weight" or importance assigned to each document when calculating the relevance of the candidate documents.

A predetermined parameterized number of terms may be fed from the term selector 210 to the document lookup 220. During document lookup, an index lookup is performed for each of the selected terms so as to find the set of documents that contain the term. Terms that index into more than a parameterized percentage of the total number of documents are considered to be too common to be useful in finding documents relevant to the set of input documents and may therefore be ignored. Such ignored terms may be replaced with additional terms if available.

The union of all such document sets, (that is, for each term, the set of documents that contain the term), for each of the selected terms is the set of documents which are candidates for being relevant to the input documents. Discarding common terms and the documents that they index helps keep the set of candidate documents at an optimal size for calculating the actual relevance.

For each of the candidate documents, the relevance value relVal is calculated by the relevance metric 240, taking into account the mathematical adjustment performed by the characterizer 230. The result is a set of docIDs and their corresponding relVal values which are fowarded to the external application logic 500 for use with the organization instance 100.

Given a group of example documents, each document can be represented as terms and their occurrence count in the document. Term selection can then be performed in several ways. The simplest mechanism is to combine the occurrence counts of the terms across all of the documents, sort them in descending order of the total count, and then consider the top predetermined number of these sorted terms. Various algorithms may then be used to effect document lookup and characterization and relevance calculations.

This concludes the description of the example embodiments. Although the present invention has been described with reference to a number of illustrative embodiments, it should be understood that numerous other modifications and embodiments can be devised by those skilled in the art that will fall within the spirit and scope of the principles of this invention. More particular, reasonable variations and modifications are possible in the component parts and/or arrangements of the subject combination within the scope of the foregoing disclosure, the drawings, and the appended claims without departing from the spirit of the invention. In addition to variations and modifications in the component parts and/or arrangements, alternative uses will be apparent to those skilled in the art.

What is claimed is:

1. A method comprising:
    recognizing a change to content of a user-populated list of items from an item space, wherein the user-populated list comprises two subgroups, said subgroups comprising a related-items group and a not-related-items group;
    generating a query in response to the change, said query being based on characteristics of the items indicated in the user-populated list, wherein generating the query comprises:
        finding positive characteristics among items indicated in the related items group;
        assigning a positive relevance to each positive characteristic based on a weighted occurrence of a respective positive characteristic among the items indicated in the related-items group;
        finding negative characteristics among items indicated in the not-related-items group; and
        assigning a negative relevance to each negative characteristic based on a weighted occurrence of a respective negative characteristic among the items indicated in the not-related-items group; and
    applying the query to the item space to identify a second list of items.

2. The method of claim 1 wherein applying the query comprises:
    finding target items from the item space that include at least a certain number of the positive characteristics;
    assigning a relevance score to each target item based on the positive relevances and the negative relevances of a respective target item's characteristics; and
    selecting items to populate the second list of items from among the target items based on the relevance scores.

3. The method of claim 2 wherein selecting items to populate the second list comprises one of:
    selecting all of the target items;
    selecting a certain number of target items; or
    selecting only target items that have relevance score over a certain threshold.

4. The method of claim 1 wherein recognizing the change comprises one of:
    recognizing when one of the items indicated in the user-populated list has been moved from the related-items group to the not-related-items group; or
    recognizing when one of the items indicated in the user-populated list has been moved from the not-related-items group to the related-items group.

5. The method of claim 1 wherein recognizing the change comprises one of:
    recognizing when any item has been deleted from the user-populated list; or
    recognizing when a new item has been added to the user-populated list.

6. The method of claim 1 wherein the user-populated list and the second list comprise a first organizational instance among a plurality of organizational instances, and wherein each of the plurality of organizational instances is based on a different set of target characteristics.

7. The method of claim 6 wherein recognizing the change comprises:
    recognizing when a new item has been added to the user-populated list from the second organizational instance.

8. The method of claim 1 further comprising:
    recognizing additional changes to the content of the user-populated list; and
    repeating the generating and applying for each of the additional changes.

9. The method of claim 1 wherein the item space comprises at least one of documents, files, emails, tasks, notes, instant messages, contacts, or web pages stored in memory.

10. The method of claim 1 further comprising:
storing the user-populated list;
recalling the user-populated list following a change in the item space;
regenerating the query; and
applying the query to the item space to identify an updated list of items.

11. The method of claim 1 wherein the user-populated list comprises a set of identifiers, each identifier of the set of identifiers indicating a particular item in the item space.

12. A machine readable medium having stored thereon machine executable instructions, the execution of which to implement a method comprising:
recognizing a change to content of a user-populated list of items from an item space, wherein the user-populated list comprises two subgroups, said subgroups comprising a related-items group and a not-related-items group;
generating a query in response to the change, said query being based on characteristics of the items indicated in the user-populated list, wherein generating the query comprises:
finding positive characteristics among items indicated in the related items group;
assigning a positive relevance to each positive characteristic based on a weighted occurrence of a respective positive characteristic among the items indicated in the related-items group;
finding negative characteristics among items indicated in the not-related-items group; and
assigning a negative relevance to each negative characteristic based on a weighted occurrence of a respective negative characteristic among the items indicated in the not-related-items group; and
applying the query to the item space to identify a second list of items.

13. The machine readable medium of claim 12 wherein applying the query comprises:
finding target items from the item space that include at least a certain number of the positive characteristics;
assigning a relevance score to each target item based on the positive relevances and the negative relevances of a respective target item's characteristics; and
selecting items to populate the second list of items from among the target items based on the relevance scores.

14. The machine readable medium of claim 13 wherein selecting items to populate the second list comprises one of:
selecting all of the target items;
selecting a certain number of target items; or
selecting only target items that have a relevance score over a certain threshold.

15. The machine readable medium of claim 12 wherein recognizing the change comprises one of:
recognizing when one of the items indicated in the user-populated list has been moved from the related-items group to the not-related-items group; or
recognizing when one of the items indicated in the user-populated list has been moved from the not-related-items group to the related-items group.

16. The machine readable medium of claim 12 wherein recognizing the change comprises one of:
recognizing when any item has been deleted from the user-populated list; or
recognizing when a new item has been added to the user-populated list.

17. The machine readable medium of claim 12 wherein the user-populated list and the second list comprise a first organizational instance among a plurality of organizational instances, and wherein each of the plurality of organizational instances is based on a different set of target characteristics.

18. The machine readable medium of claim 17 wherein recognizing the change comprises:
recognizing when a new item has been added to the user-populated list from a second organizational instance.

19. The machine readable medium of claim 12 further comprising:
recognizing additional changes to the content of the under-populated list: and
repeating the generating and applying for each of the additional changes.

20. The machine readable medium of claim 12 wherein the item space comprises at least one of the documents, files, emails, tasks, notes, instant messages, contacts, or web pages stored in memory.

21. The machine readable medium of claim 12 further comprising:
storing the user-populated list;
recalling the user-populated list following a change in the item space;
generating the query; and
applying the query to the item space to identify an updated list of items.

22. The machine readable medium of claim 12 wherein the user-populated list comprises a set of identifiers, each identifier of the set of identifiers indicating a particular item in the item space.

* * * * *